United States Patent [19]

Ishikawa et al.

[11] Patent Number: 4,923,762
[45] Date of Patent: May 8, 1990

[54] PRECOATED STEEL SHEET FOR TWO-PIECE CAN

[75] Inventors: Hiroshi Ishikawa; Naoki Gunji, both of Tokyo; Yoshinori Hoshino, Kawagoe; Taro Ohyama, Hoya, all of Japan

[73] Assignees: NKK Corporation; Toyo Ink Mfg. Co., Ltd., both of Tokyo, Japan

[21] Appl. No.: 382,108

[22] Filed: Jul. 19, 1989

[30] Foreign Application Priority Data

Jul. 27, 1988 [JP] Japan ................... 63-187685

[51] Int. Cl.$^5$ ................................. B22F 3/24
[52] U.S. Cl. ..................... 428/551; 428/553; 428/564; 428/565; 428/626; 419/9; 419/10
[58] Field of Search ............... 428/551, 626, 553, 564, 428/565; 419/9, 10

[56] References Cited

U.S. PATENT DOCUMENTS

| | | | |
|---|---|---|---|
| 3,832,962 | 9/1974 | Rolles | 113/120 A |
| 4,125,670 | 11/1978 | Perfetti et al. | 428/626 |
| 4,160,056 | 7/1979 | Tanaka et al. | 428/220 |
| 4,177,323 | 12/1979 | Obi et al. | 428/622 |
| 4,210,259 | 7/1980 | Schrecker | 220/455 |
| 4,355,124 | 10/1982 | Baumann et al. | 524/104 |

FOREIGN PATENT DOCUMENTS

| | | |
|---|---|---|
| 51-63787 | 6/1976 | Japan . |
| 57-168961 | 10/1982 | Japan . |
| 58-18229 | 4/1983 | Japan . |
| 60-4753 | 2/1985 | Japan . |
| 62-275172 | 11/1987 | Japan . |

*Primary Examiner*—Stephen J. Lechert, Jr.
*Assistant Examiner*—Ngoclan Mai
*Attorney, Agent, or Firm*—Frishauf, Holtz, Goodman & Woodward

[57] ABSTRACT

A precoated steel sheet for a two-piece can, which comprises: a steel sheet; a precoating film formed on one surface of the steel sheet, which is to be the outer surface of a two-piece can, by applying a precoating composition onto the one surface of the steel sheet and curing same; and another precoating film formed on the other surface of the steel sheet, which is to be the inner surface of the two-piece can, by applying another precoating composition onto the other surface of the steel sheet and curing same. The above-mentioned precoating composition comprises a thermosetting coating material and an internal lubricant having a content ratio within the range of from 0.1 to 30 weight parts relative to 100 weight parts of a resin as a solid content in the thermosetting coating material. The above-mentioned another precoating composition comprises the above-mentioned thermosetting coating material and an aluminum powder having a content ratio within the range of from 10 to 400 weight parts relative to 100 weight parts of the resin as the solid content in the thermosetting material.

10 Claims, No Drawings

PRECOATED STEEL SHEET FOR TWO-PIECE CAN

As far as we know, there are available the following prior art documents pertinent to the present invention:

(1) Japanese Patent Provisional Publication No. 51-63,787 dated Jun. 2, 1976;

(2) Japanese Patent Publication No. 60-4,753 dated Feb. 6, 1985;

(3) Japanese Patent Publication No. 58-18,229 dated Apr. 12, 1983;

(4) Japanese Patent Provisional Publication No. 57-168,961 dated Oct. 18, 1982; and (5) Japanese Patent Provisional Publication No. 62-275,172 dated Nov. 30, 1987.

The contents of the above-mentioned prior art documents will be discussed hereafter under the heading of the "BACKGROUND OF THE INVENTION."

FIELD OF THE INVENTION

The present invention relates to a precoated steel sheet, onto each of the both surface of which a precoating composition has previously been applied, for manufacturing a can body of a two-piece can comprising the can body and a top.

BACKGROUND OF THE INVENTION

A can body of a drawn and ironed can (hereinafter referred to as the "DI can") which is a kind of the two-piece cans, is conventionally manufactured by means of a drawing and ironing forming (hereinafter referred to as the "DI forming") which comprises the steps of: drawing a circular sheet cut from a metal sheet by forcedly passing the circular sheet through a die with the use of a punch to form a cup, and then, redrawing and ironing the thus formed cup by forcedly and continuously passing the cup through a plurality of different dies with the use of another punch, thereby obtaining a can body having a thickness considerably thinner than that of the circular sheet.

A can body of a drawn and redrawn can (hereinafter referred to as the "DRD can") which is also a kind of the two-piece cans, is conventionally manufactured by means of a drawing and redrawing forming (hereinafter referred to as the "DRD forming") which comprises the steps of: drawing a circular sheet cut from a metal sheet by forcedly passing the circular sheet through a die with the use of a punch to form a cup, and then, redrawing the thus formed cup by forcedly passing the cup through another die with the use of another punch, thereby obtaining a can body.

The two-piece can such as the DI can or the DRD can as described above is light in weight because of the reduced thickness of the can body as compared with a so-called three-piece can, which comprises a top, a bottom, and a drum, prepared by soldering or welding, and free from leakage of the content because of the absence of a joint in the drum. For these advantages, there is an increasing demand for two-piece cans, and the range of uses thereof is expected to expand.

As a metal sheet for the two-piece can, it is the usual practice to use an electrolytic tin-plated steel sheet or an aluminum sheet. The demand for the two-piece can made of the electrolytic tin-plated steel sheet is expected to grow since the electrolytic tin-plated steel sheet is lower in cost than the aluminum sheet. The weight of deposited tin of the electrolytic tin-plated steel sheet is relatively slight. However, under the influence of the recent cost increase of electric power and tin, the increase in the manufacturing cost of the electrolytic tin-plated steel sheets and the two-piece cans made of the electrolytic tin-plated steel sheets is inevitable. There is therefore a strong demand for reducing the manufacturing cost of the electrolytic tin-plated steel sheets.

The reduction ratio of the thickness of the side wall of the can body of the DI can is so large as about 70% under the effect of ironing. It is therefore necessary to previously impart lubricity to the surface of the metal sheet. The tin-plating layer of an electrolytic tin-plated steel sheet provides an excellent lubricity to the steel sheet. However, if the weight of the deposited tin-plating layer is reduced with a view to reducing the manufacturing cost of the electrolytic tin-plated steel sheets, the following problems are caused in a DI can:

(1) The smaller weight of the deposited tin-plating layer results in a lower lubricity which in turn leads to a lower DI formability. As a result, during the passage of the can body through the dies in ironing, a sticking of the can body to the dies or a galling of the can body may occur under the effect of a friction heat and a working heat. Occurrence of such stricking or galling deteriorates corrosion resistance of the DI can.

(2) Rust tends to occur on the surface of the can body of the DI can after removing grease such as an external lubricant deposited onto the surface of the can body of the DI can during ironing.

As methods for solving the above-mentioned problems, the following methods are known:

(1) A method for manufacturing a can body of the DI can, disclosed in Japanese Patent Provisional Publication No. 51-63,787 dated Jun. 2, 1976, which comprises:

applying a precoating composition comprising any one of epoxy-phenol resin, epoxy-ureaformaldehyde resin and vinyl resin, or a precoating composition comprising any one of the above-mentioned resins and an internal lubricant, onto at least one surface of a metal sheet, to form a precoating film thereon, then partially curing the precoating film, and then subjecting the metal sheet having such a precoating film to the DI forming, thereby obtaining a can body of the DI can (hereinafter referred to as the "prior art 1").

(2) A method for manufacturing a can body of the DI can, disclosed in Japanese Patent Publication No. 60-4,753 dated Feb. 6, 1985, which comprises:

applying a precoating composition comprising epoxy-phenol resin or a precoating composition comprising epoxy-phenol resin and an internal lubricant onto the both surfaces of a surface-treated steel sheet to form a precoating film thereon, then partially curing the precoating film, then subjecting the surface-treated steel sheet having such a precoating film to the DI forming, and then completely curing the precoating film, thereby obtaining a can body of the DI can (hereinafter referred to as the "prior art 2").

(3) A precoated steel sheet for a DI can, disclosed in Japanese Patent Publication No. 58-18,229 dated Apr. 12, 1983, which comprises:

a steel sheet; and a precoating film formed on at least one surface of the steel plate, which is to be the outer surface of a two-piece can, by applying a precoating composition onto the at least one surface of the steel sheet and completely curing same, said precoating composition comprising (a) phenol modified epoxy resin comprising thermosetting phenol resin and bisphenol A type epoxy resin, and (b) olefinic hydrocarbon (hereinafter referred to as the "prior art 3").

(4) A precoating composition, disclosed in Japanese Patent Provisional Publication No. 57-168,961 dated Oct. 18, 1982, which comprises:

phenol resin, epoxy resin, vinyl chloride-vinyl acetate copolymer and polyvinyl chloride dispersed resin. The above-mentioned precoating composition may contain as required an internal lubricant such as wax, lanoline or petrolatum (hereinafter referred to as the "prior art 4").

(5) A precoated metal sheet for a two-piece can, disclosed in Japanese Patent Provisional Publication No. 62-275,172 dated Nov. 30, 1987, which comprises:

a metal sheet; a precoating film formed on one surface of the metal sheet, which is to be the outer surface of a two-piece can, by applying a precoating composition onto the one surface of the metal sheet and curing same, the above-mentioned precoating composition comprising a thermosetting coating material and a modified hydrocarbon wax as an internal lubricant, having a content ratio within the range of from 0.1 to 30 weight parts relative to 100 weight parts of a resin as a solid content in the thermosetting coating material; and another precoating film formed on the other surface of the metal sheet, which is to be the inner surface of the two-piece can, by applying another precoating composition onto the other surface of the metal sheet and curing same, the above-mentioned another precoating composition comprising only the above-mentioned thermosetting coating material, and containing no internal lubricant (hereinafter referred to as the "prior art 5").

The above-mentioned prior arts 1 to 4 have the following problems: Lubricity of the metal sheet during the DI forming cannot be increased sufficiently by means of any of the prior arts 1 to 4, and as a result, it is impossible to improve the DI formability of the metal sheet. In the prior art 1, furthermore, since curing of the precoating film is only partial, a precipitate from the precoating film not only deteriorates flavor and perfume of the content in the can, but also leads to a lower corrosion resistance of the DI can after painting. In the prior art 2, curing of the precoating film accomplished in two steps requires more complicated manufacturing processes and results in a higher manufacturing cost of the DI can.

According to the prior art 5, the problems involved in the prior arts 1 to 4 are solved, improving the DI formability of the metal sheet. However, the DI formability of the metal sheet can be improved in the prior art 5 only when the cup formed by drawing is subjected to ironing by causing same to forcedly and continuously pass through a plurality of dies with the use of a punch at a punching speed, i.e., a forming speed as slow as about 30 m/minute. A high forming speed of at least 100 m/minute causes the following problems: A high forming speed of at least 100 m/minute produces a high frictional heat and a high working heat during ironing between the dies and the outer surface of the can body and between the punch and the inner surface of the can body. The thus produced frictional heat and working heat cause softening of the precoating film formed on the inner surface of the can body, and sticking thereof onto the punch. As a result, when withdrawing the punch from the can body after ironing, the precoating film formed on the inner surface of the can body is peeled off from the inner surface of the can body, and gathers near the open end of the can body, thus producing a so-called build-up phenomenon of the precoating film. This seriously increases frictional resistance between the punch and the inner surface of the can body, and the can body moves along with the punch. As a result, the side wall of the can body buckles under the effect of the stripper, thus deteriorating strippability of the can body. In addition, peeling-off of, or damage to, the precoating film formed on the inner surface of the can body deteriorates corrosion resistance of the two-piece can.

Under such circumstances, there is a strong demand for the development of a precoated steel sheet for a two-piece can, which is excellent in DI formability, DRD formability and corrosion resistance, and the precoating film of which is never peeled off or damaged even when ironing the precoated steel sheet at a high forming speed of at least 100 m/minute, but such a precoated steel sheet for a two-piece can has not as yet been proposed.

SUMMARY OF THE INVENTION

An object of the present invention is therefore to provide a precoated steel sheet for a two-piece can, which is excellent in DI formability, DRD formability and corrosion resistance, and the precoating film of which is never peeled off or damaged even when ironing the precoated steel sheet at a high forming speed of at least 100 m/minute.

In accordance with one of the features of the present invention, there is provided a precoated steel sheet for a two-piece can, characterized by comprising:

a steel sheet;

a precoating film formed on one surface of said steel sheet by applying a precoating composition onto said one surface of said steel sheet and then curing same, said one surface of said steel sheet being to be the outer surface of a two-piece can, and said precoating composition comprising:

(a) an internal lubricant, the content ratio of said internal lubricant being within the range of from 0.1 to 30 weight parts relative to 100 weight parts of said resin as said solid content in said thermosetting coating material; and another precoating film formed on the other surface of said steel sheet by applying another precoating composition onto said other surface of said steel sheet and then curing same, said other surface of said steel sheet being to be the inner surface of said two-piece can, and said another precoating composition comprising:

(a) said thermosetting coating material, and (b) an aluminum powder, the content ratio of said aluminum powder being within the range of from 10 to 400 weight parts relative to 100 weight parts of said resin as said solid content in said thermosetting coating material.

DETAILED DESCRIPTION OF PREFERRED EMBODIMENTS

From the above-mentioned point of view, extensive studies were carried out with a view to developing a precoated steel sheet for a two-piece can, which is excellent in DI formability, DRD formability and corrosion resistance, and the precoating film of which is never peeled off or damaged even when ironing the precoated steel sheet at a high forming speed of at least 100 m/minute. As a result, the following findings were obtained: A precoated steel sheet, having a precoating film of a precoating composition comprising a thermosetting coating material and an internal lubricant, on one surface of a steel sheet to be the outer surface of a two-piece can, and having another precoating film of another precoating composition comprising the above-mentioned thermosetting coating material and an aluminum powder, on the other surface of the steel sheet to be the inner surface of the two-piece can, is provided with the above-mentioned properties and is therefore optimum as a precoated steel sheet for a two-piece can.

The present invention was made on the basis of the above-mentioned findings. The precoated steel sheet for a two-piece can of the present invention is described below.

In the present invention, a precoating film of a precoating composition comprising:
(a) a thermosetting coating material comprising a resin as a solid content and a solvent, and
(b) an internal lubricant,
is formed on one surface of a steel sheet, which is to be the outer surface of a two-piece can. The above-mentioned precoating film of the precoating composition containing the internal lubricant is formed on the one surface of the steel sheet, which is to be the outer surface of the two-piece can, for the purpose of imparting lubricity to the precoating film by means of the internal lubricant, thus improving the DI formability and the DRD formability of the precoated steel sheet.

The content ratio of the internal lubricant to the thermosetting coating material comprising the resin as the solid content and the solvent, should be limited within the range of from 0.1 to 30 weight parts relative to 100 weight parts of the resin as the solid content in the thermosetting coating material. With a content ratio of the internal lubricant of under 0.1 weight parts, improvement of the DI formability of the precoated steel sheet would be insufficient. A content ratio of the internal lubricant of over 30 weight parts, on the other hand, increases thixotropy of the precoating composition, resulting not only in a lower paintability of the precoating composition, but also in an unfavorable economic condition.

As the internal lubricant, it is necessary to use a lubricant which is solid at the room temperature and imparts lubricity to the precoating film, such as a mineral wax including paraffin wax, a synthetic wax including polyethylene wax, an animal wax or a vegetable wax. A preferable internal lubricant is polytetrafluoroethylene modified hydrocarbon wax. Polytetrafluoroethylene modified hydrocarbon wax is available by mixing fine particles of polytetrafluoroethylene and fine particles of hydrocarbon wax with the use, for example, of a strong mill such as a jet mill, and causing deposition of the fine particles of polytetrafluoroethylene onto the surface of the particle of hydrocarbon wax. Such a polytetrafluoroethylene modified hydrocarbon wax is commercially available under the commercial names of "LANCO WAX TEF 1778 and LANCO WAX TEF 1780" (made by George M. Langer & Company).

In the present invention, another precoating film of another precoating composition comprising:
(a) a thermosetting coating material comprising a resin as a solid content and a solvent, and
(b) an aluminum powder,
is formed on the other surface of the steel sheet, which is to be the inner surface of the two-piece can. The above-mentioned another precoating film of the another precoating composition containing the aluminum powder is formed on the other surface of the steel sheet, which is to be the inner surface of the two-piece can, for the purpose of increasing a softening temperature and a hardness of the another precoating film by means of the aluminum powder. As a result, even when carrying out ironing at a high forming seed of at least 100 m/minute, the another precoating film formed on the inner surface of the can body never softens under the effect of the produced frictional heat and working heat. It is therefore possible to avoid peeling-off of, or damage to, the another precoating film formed on the inner surface of the can body during ironing, thus improving strippability of the can body. Furthermore, the electrolytic protection function as a sacrificial metal of the aluminum powder present in the another precoating film improves corrosion resistance of the inner surface of the can body.

The content ratio of the aluminum powder to the thermosetting coating material comprising the resin as the solid content and the solvent, should be limited within the range of from 10 to 400 weight parts relative to 100 weight parts of the resin as the solid content in the thermosetting coating material. With a content ratio of the aluminum powder of under 10 weight parts, the above-mentioned improvement of strippability and corrosion resistance of the can body would be insufficient. A content ratio of the aluminum powder of over 400 weight parts causes, on the other hand, production of stripy flaws or a galling during ironing, thus causing easier occurrence of peeling-off of the another precoating film. The content ratio of the aluminum powder should preferably be limited within the range of from 10 to 200 weight parts relative to 100 weight parts of the resin as the solid content in the thermosetting coating material, and more preferably be limited within the range of from 10 to 90 weight parts relative to 100 weight parts of the resin as the solid content in the thermosetting coating material.

It is desirable to use an aluminum powder having a flake shape as the aluminum powder contained in the another precoating composition. The types of flake-shaped aluminum powder include that having leafing property (hereinafter referred to as the "leafing type") and that not having leafing property (hereinafter referred to as the "non-leafing type"). The leafing-type aluminum powder has the following properties: When forming, on the surface of a steel sheet, a precoating film of a precoating composition containing the leafing-type aluminum powder, particles of the aluminum powder gather near the surface of the precoating film, and are arranged in parallel with each other in a certain direction. As a result, a glossy precoating film with an improved strippability of the can body is available than in the case of a precoating film of a precoating composition containing the non-leafing type aluminum powder. It is therefore desirable to use a leafing-type aluminum powder as the flake-shaped aluminum powder contained in the another precoating composition.

The average particle size of the aluminum powder should preferably be within the range of from 0.5 to 35 $\mu$m. With an average particle size of the aluminum powder of under 0.5 $\mu$m, the cost would be so high that this aluminum powder is unpracticable. With an average particle size of the aluminum powder of over 35 $\mu$m, on the other hand, the thickness of the precoating film would exceed the desirable range as described later, and irregularities would occur on the surface of the precoating film, thus resulting in a lower DI formability of the precoated steel sheet and in the tendency of the precoating film to be easily peeled off.

The resin in the thermosetting coating material contained in the above-mentioned precoating composition and the above-mentioned another precoating composition comprises any one of a mixture of vinyl chloride resin and at least one of phenol resin and epoxy resin; a mixture of epoxy resin and phenol resin; a mixture of epoxy resin and amino resin; a mixture of polyester resin and amino resin; a mixture of epoxy resin and acrylic resin; and a mixture of epoxy-ester resin and amino resin.

A preferable thermosetting coating material among those mentioned above includes a vinyl chloride resin type organosol coating material comprising vinyl chloride resin and at least one of phenol resin and epoxy resin. This vinyl chloride resin type organosol coating material is available by adding fine particles of vinyl chloride resin having a molecular weight within the range of from about 10,000 to 100,000 and a particle size within the range of from 0.5 to 10 $\mu$m to a solvent into which at least one of phenol resin and epoxy resin is previously dissolved at a prescribed ratio, and causing the fine particles of vinyl chloride to uniformly disperse into the solvent. A preferable thermosetting coating material contained in the above-mentioned another precoating composition includes, in addition to the preferable thermosetting coating materials described above, an epoxy-phenol resin type coating material comprising bisphenol A type epoxy resin and phenol resin, and an epoxy-amino resin type coating material comprising bisphenol A type epoxy resin and amino resin.

In the present invention, the steel sheet to which the above-mentioned precoating composition of the present invention is to be applied, may be a cold-rolled steel sheet not surface-treated, a surface-treated steel sheet plated with tin, nickel or chromium, or a steel sheet having a film formed on at least one surface thereof by applying a thermosetting coating material on at least one surface of the steel sheet with or without curing after application. A chromium-plated steel sheet is particularly preferable because of the high corrosion resistance and the excellent adhesion of the precoating film. When a surface-treated steel sheet is used as the steel sheet to be applied with the precoating composition of the present invention, the plating layer is protected by the precoating film, so that the plating layer does not come into direct contact with the dies during the DI forming. Even after the DI forming, therefore, the plating layer is kept in a uniform state.

Formation of the precoating film on the one surface of the steel sheet and formation of the another precoating film on the other surface of the steel sheet are accomplished by applying the above-mentioned precoating composition onto the one surface of the steel sheet to form the precoating film, applying the above-mentioned another precoating composition onto the other surface of the steel sheet to form the another precoating film, and then curing the precoating film and the another precoating film. There is not particular limitation on the curing conditions of the precoating film and the another precoating film, for example, the precoating film and the another precoating film are heated by blowing a hot blast at a temperature of from 150° to 400° C. thereto for a period of time of from 10 seconds to 10 minutes to completely cure the precoating film and the another precoating film.

The precoating film formed on the one surface of the steel sheet and the another precoating film formed on the other surface of the steel sheet should preferably have a thickness within the range of from 1 to 20 $\mu$m. With a thickness of under 1 $\mu$m for both the precoating film and the another precoating film, the precoating film and the another precoating film are broken during the DI forming of the precoated steel sheet, thus making it impossible to keep the continuity of the films. This impairs the DI formability of the precoated steel sheet, and in the worst case, a galling occurs during the DI forming. With a thickness of over 20 $\mu$m for both the precoating film and the another precoating film, a so-called build-up phenomenon of the precoating film is easily produced during the DI forming of the precoated steel sheet, and a higher cost is required.

The precoating films are uniformly present under the effect of an improved DI formability, on the inner and outer surfaces of the can body manufactured from the precoated steel sheet of the present invention. Therefore, when the content to be filled into the can is a dried material or a liquid having a weak corroding property against the can, it is not necessary to form a top coating film on each of the inner and outer surfaces of the can. This eliminates the necessity of the process for forming the top coating film, thus enabling to reduce the manufacturing cost of the can.

When the content to be filled into the can is a liquid strongly corrosive for the can, or a material the flavor and perfume of which are particularly important, a known top coating material containing vinyl chloride resin or epoxy-acrylic resin may be applied onto the inner surface of the can. As required, furthermore, white painting and printing may be applied onto the outer surface of the can, and then a top coating material may be applied onto the surface thereof.

Now, the precoated steel sheet for a two-piece can of the present invention is described further in detail by means of examples while comparing with a precoated steel sheet for comparison outside the scope of the present invention.

EXAMPLES

Precoating compositions Nos. 1 to 16 for manufacturing precoated steel sheets within the scope of the present invention and precoated steel sheets for comparison outside the scope of the present invention, were prepared as follows:

I. Precoating composition No. 1

The following materials were prepared as the materials for the precoating composition No. 1:

(1) Thermosetting coating material: (Vinyl chloride resin type organosol coating material)

(a) Vinyl chloride paste resin: 40 weight parts
Product name: "SMILIT EX-13" (made by Sumitomo Chemical Co., Ltd.)

(b) Phenol resin: 16 weight parts
Product name: "HITANOL 4020" (made by Hitachi Chemical Co., Ltd.)

(c) Vinyl chloride-vinyl acetate-maleic acid copolymer: 40 weight parts
Product name: "BAKELITE VMCC" (made by Union Carbide Co., Ltd.)

(d) Bisphenol A type epoxy resin: 4 weight parts
Product name: "EPIKOTE 828" (made by Yuka Shell Epoxy Co., Ltd.)

(2) Aluminum powder: 30 weight parts relative to 100 weight parts of the solid content in the thermosetting coating material Product name: "ALPASTE 55-574" (containing about 66 wt. % non-leafing type aluminum powder; made by Toyo Aluminum Co., Ltd.)

Phenol resin, vinyl chloride-vinyl acetate-maleic acid copolymer, and bisphenol A type epoxy resin listed in (1) above, were dissolved into a solvent comprising 40 wt. % xylene, 30 wt. % cellosolve acetate and 30 wt. % diisobutyl ketone, then vinyl chloride paste resin listed in (1) above and aluminum powder listed in (2) above, were added to the above-mentioned solvent while stirring the solvent at a high speed to disperse same into the solvent, and thus the precoating composition No. 1 having a solid content of about 40 wt. % and a viscosity of 100 seconds (coating temperature: 25° C., Ford cup: No. 4) was prepared.

II. Precoating composition No. 2 (Vinyl chloride resin type organosol coating material)

The precoating composition No. 2 having the same chemical composition as that of the above-mentioned precoating composition No. 1 except that the content ratio of aluminum powder in the precoating composition No. 1 was changed to 50 weight parts relative to 100 weight parts of the solid content in the thermosetting coating material, was prepared.

III. Precoating composition No. 3 (Vinyl chloride resin type organosol coating material)

The precoating composition No. 3 having the same chemical composition as that of the above-mentioned precoating composition No. 1 except that the content ratio of aluminum powder in the precoating composition No. 1 was changed to 100 weight parts relative to 100 weight parts of the solid content in the thermosetting coating material, was prepared.

IV. Precoating composition No. 4 (Vinyl chloride resin type organosol coating material)

The precoating composition No. 4 having the same chemical composition as that of the above-mentioned precoating composition No. 1 except that the content ratio of aluminum powder in the precoating composition No. 1 was changed to 200 weight parts relative to 100 weight parts of the solid content in the thermosetting coating material, was prepared.

V. Precoating composition No. 5 (Vinyl chloride resin type organosol coating material)

The precoating composition No. 5 having the same chemical composition as that of the above-mentioned precoating composition No. 1 except that the content ratio of aluminum powder in the precoating composition No. 1 was changed to 400 weight parts relative to 100 weight parts of the solid content in the thermosetting coating material, was prepared.

VI. Precoating composition No. 6

The following materials were prepared as the materials for the precoating composition No. 6:

(1) Thermosetting coating material: (Epoxy-phenol resin type coating material)
   (a) Bisphenol A type epoxy resin: 80 weight parts
   Product name: "EPIKOTE 1009" (made by Yuka Shell Epoxy Co., Ltd.)
   (b) Phenol resin: 20 weight parts
   Product name: "HITANOL 4020" (made by Hitachi Chemical Co., Ltd.)

(2) Aluminum powder: 30 weight parts relative to 100 weight parts of the solid content in the thermosetting coating material
   Product name: "ALPASTE 55-574" (containing about 66 wt. % non-leafing type aluminum powder; made by Toyo Aluminum Co., Ltd.)

Bisphenol A type epoxy resin and phenol resin listed in (1) above, were dissolved into a solvent comprising 12 wt.% xylene, 55 wt.% cellosolve acetate, 10 wt. % N-butanol and 23 wt. % cyclohexanone, then aluminum powder listed in (2) above was added to the above-mentioned solvent while stirring the solvent at a high speed to disperse same into the solvent, and thus the precoating composition No. 6 having a solid content of about 35 wt. % and a viscosity of 70 seconds (coating temperature: 25° C.; Ford cup: No. (4) was prepared.

VII. Precoating composition No. 7

The following materials were prepared as the materials for the precoating composition No. 7:

(1) Thermosetting coating material: (Epoxy-amino resin type coating material)
   (a) Bisphenol A type epoxy resin: 90 weight parts
   Product name: "EPIKOTE 1007" (made by Yuka Shell Epoxy Co., Ltd.)
   (b) Urea-formaldehyde resin: 10 weight parts
   Product name: "MELAN 11E" (made by Hitachi Chemical Co., Ltd.)

(2) Aluminum powder: 30 weight parts relative to 100 weight parts of the solid content in the thermosetting coating material
   Product name: "ALPASTE 55-574" (containing about 66 wt. % non-leafing type aluminum powder; made by Toyo Aluminum Co., Ltd.)

Bisphenol A type epoxy resin and urea-formaldehyde resin listed in (1) above, were dissolved into a solvent comprising 15 wt. % diacetone alcohol, 7 wt. % methylisobutyl carbitol and 78 wt. % ethyl cellosolve, then aluminum powder listed in (2) above was added to the above-mentioned solvent while stirring the solvent at a high speed, to disperse same into the solvent, and thus the precoating composition No. 7 having a solid content of about 35 wt. % and a viscosity of 60 seconds (coating temperature: 25° C.; Ford cup: No. 4) was prepared.

VIII. Precoating composition No. 8 (Vinyl chloride resin type organosol coating material)

The precoating composition No. 8 having the same chemical composition as that of the above-mentioned precoating composition No. 1 except that the aluminum powder was not added, was prepared.

IX. Precoating composition No. 9 (Epoxy-phenol resin type coating material)

The precoating composition No. 9 having the same chemical composition as that of the above-mentioned precoating composition No. 6 except that the aluminum powder was not added, was prepared.

X. Precoating composition No. 10 (Epoxy-amino resin type coating material)

The precoating composition No. 10 having the same chemical composition as that of the above-mentioned precoating composition No. 7 except that the aluminum powder was not added, was prepared.

XI. Precoating composition No. 11

The following materials were prepared as the materials for the precoating composition No. 11:

(1) Thermosetting coating material (Vinyl chloride resin type organosol coating material)

(a) Vinyl chloride paste resin: 45 weight parts
Product name: "SMILIT EX-13" (made by Sumitomo Chemical Co., Ltd.)

(b) Phenol resin: 10 weight parts
Product name: "HITANOL 4020" (made by Hitachi Chemical Co., Ltd.)

(c) Oil-free alkyd resin: 25 weight parts
Product name: "ALMATEX P-646" (made by Mitsui Toatsu Chemicals, Inc.)

(d) Polyester type plasticizer: 20 weight parts
Product name: "POLYCIZER P-202" (made by Dainippon Ink Co., Ltd.)

(2) Internal lubricant:
Polytetrafluoroethylene modified polyethylene wax: 20 weight parts relative to 100 weight parts of the solid content in the thermosetting coating material
Product name: "LANCO WAX TEF1778" (made by George M. Langer and Company)
Melting point: from 100° to 110° C.

(3) Organic tin type stabilizer: 1.6 weight parts relative to 100 weight parts of vinyl chloride paste resin Phenol resin, oil-free alkyd resin and polyester type plasticizer listed in (1) above and organic tin type stabilizer listed in (3) above, were dissolved into a solvent comprising 40 wt. % xzylene, 30 wt. % cellosolve acetate and 30 wt. % diisobutyl ketone, then vinyl chloride paste resin listed in (1) above and polytetrafluoroethylene modified polyethylene wax listed in (2) above, were added to the above-mentioned solvent while stirring the solvent at a high speed to disperse same into the solvent, and thus the precoating composition No. 11 having a solid content of about 45 wt. %, and a viscosity of 90 seconds (coating temperature: 25° C., Ford cup: No. (4) was prepared.

XII. Precoating composition No. 12 (Vinyl chloride resin type organosol coating material)

The precoating composition No. 12 having the same chemical composition as that of the above-mentioned precoating composition No. 11 except that the internal lubricant was not added, was prepared.

XIII. Precoating composition No. 13 (Vinyl chloride resin type organosol coating material)

The precoating composition No. 13 having the same chemical composition as that of the above-mentioned precoating composition No. 11 except that the following internal lubricant was used in place of polytetrafluoroethylene modified polyethylene wax as the internal lubricant in the precoating composition No. 11, was prepared.

Internal lubricant:
Polyethylene wax: 10 weight parts relative to 100 weight parts of the solid content in the thermosetting coating material
Product name: "AC POLYETHYLENE 680" (made by Allied Chemical Co.)

XIV. Precoating composition No. 14 (Vinyl chloride resin type organosol coating material)

The precoating composition No. 14 having the same chemical composition as that of the above-mentioned precoating composition No. 1 except that the following aluminum powder was used with the following content ratio in place of the aluminum powder (product name: "ALPASTE 55-574") in the precoating composition No. 1, was prepared.

Aluminum powder: 30 weight parts relative to 100 weight parts of the solid content in the thermosetting coating material
Product name: "ALPASTE 0200M" (containing about 65 wt. % leafing type aluminum powder; made by Toyo Aluminum Co., Ltd.)

XV. Precoating composition No. 15 (Vinyl chloride resin type organosol coating material)

The precoating composition No. 15 having the same chemical composition as that of the above-mentioned precoating composition No. 1 except that the following aluminum powder was used with the following content ratio in place of the aluminum powder (product name: "ALPASTE 55-574") in the precoating composition No. 1, was prepared.

Aluminum powder: 50 weight parts relative to 100 weight parts of the solid content in the thermosetting coating material
Product name: "ALPASTE 0200M" (containing about 65 wt. % leafing type aluminum powder; made by Toyo Aluminum Co., Ltd.)

XVI. Precoating composition No. 16 (Vinyl chloride resin type organosol coating material)

The precoating composition No. 16 having the same chemical composition as that of the above-mentioned precoating composition No. 1 except that the following aluminum powder was used with the following content ratio in place of the aluminum powder (product name: "ALPASTE 55-574") in the precoating composition No. 1, was prepared.

Aluminum powder: 100 weight parts relative to 100 weight parts of the solid content in the thermosetting coating material
Product name: "ALPASTE 0200M" (containing about 65 wt. % leafing type aluminum powder; made by Toyo Aluminum Co., Ltd.)

Then, as steel sheets onto which the above-mentioned precoating compositions Nos. 1 to 16 were applied, surface-treated steel sheets A, B, C and D, and a steel sheet not surface-treated E were prepared as follows:

I. Surface-treated steel sheet A (Electrolytic chromated Steel Sheet)

The both surfaces of a low-carbon cold-rolled steel sheet having a thickness of 0.3 mm were cleaned through conventional electrolytic degreasing and electrolytic pickling, and then, the above-mentioned steel sheet was subjected to a cathodic electrolytic treatment under the following conditions to form, on each of the both surfaces of the steel sheet, a metallic chromium layer in an amount of 50 mg/m$^2$ per side and a hydrated chromium oxide layer in an amount of 15 mg/m$^2$ per side on the metallic chromium layer:

(1) Chemical composition of bath:
Chromic anhydride ($CrO_3$) : 70 g/l,
Ammonium fluoride ($NH_4F$) : 20 g/l,
(2) Bath temperature : 50° C.,
(3) Electric current density : 30 A/dm$^2$,
(4) Treating time : 1 second.

II. Surface-treated steel sheet B (Electrolytic nickel-plated steel sheet)

The both surfaces of a low-carbon cold-rolled steel sheet having a thickness of 0.3 mm were cleaned through conventional electrolytic degreasing and electrolytic pickling, and then the above-mentioned steel sheet was subjected to an electrolytic nickel-plating treatment under the following conditions to form, on each of the both surfaces of the steel sheet, a nickel-plating layer in an amount of 50 mg/m² per side:

(1) Chemical composition of bath:
Nickel sulfate : 240 g/l,
Nickel chloride : 45 g/l,
Boric acid : 30 g/l,
Tartaric acid : 30 g/l,
Ammonium fluoride : 15 g/l,
(2) Bath temperature : 50° C.,
(3) Electric current density : 5 A/dm²,
(4) Treating time : 1 second.

Then, the electrolytic nickel-plated steel sheet prepared as described above, was subjected to a cathodic electrolytic treatment under the following conditions to form a hydrated chromium oxide layer in an amount of 15 mg/m² per side on each of the nickel-plating layers:

(1) Chemical composition of bath:
Chromic anhydride ($CrO_3$) : 30 g/l,
(2) Bath temperature : 50° C.,
(3) Electric current density : 10 A/dm²,
(4) Treating time : 1 second.

III. Surface-treated steel sheet C (Electrolytic tin-plated steel sheet)

The both surfaces of a low-carbon cold-rolled steel sheet having a thickness of 0.3 mm were cleaned through conventional electrolytic degreasing and electrolytic pickling, and then, the above-mentioned steel sheet was subjected to an electrolytic tin-plating treatment under the following conditions to form, on each of the both surfaces of the steel sheet, a tin-plating layer in an amount of 0.34 g/m² per side:

(1) Chemical composition of bath:
Tin ($Sn^{2+}$) : 30 g/l,
Free acid (as converted into sulfuric acid) : 15 g/l,
Epoxy naphthol sulfonic acid : 5 g/l,
(2) Bath temperature : 40° C.,
(3) Electric current density : 6 A/dm²,
(4) Treating time : 1 second.

Then, the electrolytic tin-plated steel sheet prepared as described above, was subjected to a cathodic electrolytic treatment under the following conditions to form a hydrated chromium oxide layer in an amount of 15 mg/m² per side on the tin plating layer:

(1) Chemical composition of bath:
Chromic anhydride ($CrO_3$) : 30 g/l,
(2) Bath temperature : 50° C.,
(3) Electric current density : 10 A/dm²,
(4) Treating time : 1 second.

IV. Surface-treated steel sheet D (Electrolytic tin-plated steel sheet)

The surface-treated steel sheet D identical with the above-mentioned surface-treated steel sheet C except that the electric current density among the electrolytic tin-plating conditions in the surface-treated steel sheet C was changed to 30 A/dm² with a treating time of two seconds, and a tin-plating layer in an amount of 5.6 g/m² per side was formed on each of the both surfaces of the steel sheet, was prepared.

V. Steel sheet not surface-treated E (Low-carbon cold-rolled steel sheet having a thickness of 0.3 mm)

Using the above-mentioned precoating compositions Nos. 1 to 16 and the above-mentioned steel sheets A to E, precoated steel sheets within the scope of the present invention (hereinafter referred to as the "steel sheets of the invention") Nos. 1 to 14 and precoated steel sheets for comparison outside the scope of the present invention (hereinafter referred to as the "steel sheets for comparison") Nos. 1 to 7 were prepared as shown in Table 1.

Each of the above-mentioned steel sheets of the invention Nos. 1 to 14 and the steel sheets for comparison Nos. 1 to 7 was prepared by applying any one of the above-mentioned precoating compositions Nos. 1 to 16 onto the surface of the steel sheet with a thickness of 5 μm by means of the rolls, and then, curing the thus formed precoating film at a temperature of 205° C. for ten minutes in a box type oven.

TABLE 1

| No. | Kind of precoating composition For one surface of steel sheet to be outer surface of can | For other surface of steel sheet to be inner surface of can | Kind of steel sheet |
|---|---|---|---|
| \multicolumn{4}{Steel sheet of the invention} |
| 1 | No. 11 | No. 1 | A |
| 2 | No. 11 | No. 2 | A |
| 3 | No. 11 | No. 3 | A |
| 4 | No. 11 | No. 4 | A |
| 5 | No. 11 | No. 5 | A |
| 6 | No. 11 | No. 6 | A |
| 7 | No. 11 | No. 7 | A |
| 8 | No. 13 | No. 3 | A |
| 9 | No. 11 | No. 2 | B |
| 10 | No. 11 | No. 2 | C |
| 11 | No. 11 | No. 2 | E |
| 12 | No. 11 | No. 14 | A |
| 13 | No. 11 | No. 15 | A |
| 14 | No. 11 | No. 16 | A |
| \multicolumn{4}{Steel sheet for comparison} |
| 1 | No. 11 | No. 8 | A |
| 2 | No. 11 | No. 9 | A |
| 3 | No. 11 | No. 10 | A |
| 4 | No. 11 | No. 11 | A |
| 5 | No. 11 | No. 12 | A |
| 6 | No. 11 | No. 13 | A |
| 7 | — | — | D |

For each of the steel sheets of the invention Nos. 1 to 14 and the steel sheets for comparison Nos. 1 to 7, DI formability, strippability and corrosion resistance were evaluated by the following performance tests. The results of evaluation are shown in Table 2.

(1) DI formability

First, in accordance with the above-mentioned conventional DI forming, a can body of the DI can was prepared from a circular sheet having a diameter of 123 mm cut from each of the steel sheets of the invention Nos. 1 to 14 and the steel sheets for comparison Nos. 1 to 7. More specifically, the circular sheet was subjected to a drawing by forcedly passing the circular sheet through a die with the use of a punch to form a cup having an inner diameter of 72 mm and a height of 36 mm. Then the thus formed cup was subjected to a redrawing and a three-stage ironing by forcedly and continuously passing the cup through a plurality of different dies with the use of another punch at a punching speed of 100 m/minute and a punching stroke of 500 mm to obtain a can body of the DI can, which can body had an inner diameter of 52 mm and a height of 130 mm. The reduction ratios for the three stages of ironing were 30%, 28% and 24%, respectively. During the redrawing and the ironing, a conventional external lubricant at a temperature within the range of from the room temperature to 100° C. was supplied into the gap between the dies and the outer surface of the cup, and into the gap between the punch and the inner surface of the cup.

A DI formability was evaluated by measuring a forming load at each of the reductions for the three stages of ironing in the DI forming of the can body by means of a load cell attached to the punch, calculating a forming energy at each of the reductions for the three stages of ironing from the punching stroke in accordance with the following formula:

$$E = \int p \cdot g \cdot ds$$

where,
E: forming energy,
p: forming load,
g: gravitational acceleration, and
ds: variation of punching stroke, then, totalling the values of the thus calculated forming energy (E) at the reductions for the three stages of ironing, and using the thus obtained total amount of the values of forming energy (E) as the criterion. It is needless to mention that a smaller total amount of forming energy (E) represents a higher DI formability.

(2) Strippability

A strippability was evaluated by measuring a load acting on the punch when withdrawing the punch from the formed can body, obtained through measurement of the load, by means of a load cell attached to the punch, during preparing the can body in accordance with the DI forming described as to DI formability under (1) above, and using the thus measured load as the criterion. It is needless to mention that a smaller load represents a more excellent strippability.

(3) Corrosion resistance

First, a conventional degreasing solution having a pH value of 8.5, concentration of 2 wt. % and a temperature of 50° C. was sprayed for two minutes onto both of the inner and outer surfaces of the can body which was prepared in accordance with the DI forming described as to the DI formability under (1) above, to remove the external lubricant deposited onto the both surfaces of the can body. Then, a 20 wt. % solution of the following conventional top coating material (solvent thereof comprising methyl ethyl ketone and xylene):
Top coating material:
Vinyl chloride-vinyl acetate-maleic acid copolymer: Product name: "BAKELITE VMCH" (made by Union Carbide Co., Ltd.)
was sprayed onto the inner surface of the can body in an amount of 250 mg per can body to form a top coating film on the inner surface of the can body. Then, the thus formed top coating film was baked at a temperature of 205° C. for three minutes.

Regarding the corrosion resistance, an under cutting corrosion resistance (hereinafter referred to as the "UCC resistance") and an iron pickup resistance (hereinafter referred to as the "IP resistance") were evaluated for the inner surface of the can body through the following performance tests.

(a) Under cutting corrosion test:

An under cutting corrosion test was carried out as follows: A test piece having dimensions of 50 mm × 70 mm was sampled from each of the can bodies prepared as described above. A cruciform notch was provided to a depth reaching the substrate on one surface of the test piece, which corresponded to the inner surface of the can body, and an adhesive tape was stuck onto the other surface of the test piece, which corresponded to the outer surface of the can body, and the edge of the test piece, to seal the other surface and the edge of the test piece. Then, the test piece was immersed into a test solution containing 1.5 wt. % citric acid and 1.5 wt. % sodium chloride and having a temperature of 38° C. for 96 hours. Then, an adhesive tape was stuck onto the cruciform notch portion on the one surface of the test piece, and then, the adhesive tape was peeled off. The width of corrosion on the cruciform notch portion and the state of peeling-off of the precoating film and the top coating film were investigated for the evaluation of the UCC resistance. The criteria of evaluation were as follows: ⊚: excellent, ○: good, \: fair, (b) Iron pickup test:

An iron pickup test was carried out as follows: Each of the can bodies prepared as described above was filled with Pepsi Cola in an amount of 250 cc, and the can body was air-tightly closed by fitting a top. The can thus filled with Pepsi Cola was left at a temperature of 38° C. for six months, and the amount of Fe ion (ppm) dissolved from the can into Pepsi Cola was measured by the atomic absorption analysis for the evaluation of the IP resistance.

TABLE 2

| No. | DI formability (Forming energy in Joule) | Strippability (kg) | Corrosion resistance UCC resistance | IP resistance (ppm) |
|---|---|---|---|---|
| Steel sheet of the invention | | | | |
| 1 | 2,240 | 297 | ⊚ | 1> |
| 2 | 2,210 | 198 | ⊚ | trace |
| 3 | 2,200 | 165 | ⊚ | " |
| 4 | 2,250 | 198 | ⊚ | " |
| 5 | 2,250 | 220 | ⊚ | " |
| 6 | 2,250 | 195 | ⊚ | " |
| 7 | 2,250 | 195 | ⊚ | " |
| 8 | 2,700 | 180 | ⊚ | " |
| 9 | 2,200 | 198 | ⊚ | " |
| 10 | 2,250 | 198 | ⊚ | " |
| 11 | 2,230 | 198 | ○ | 1> |
| 12 | 2,220 | 190 | ⊚ | trace |
| 13 | 2,210 | 163 | ⊚ | " |
| 14 | 2,230 | 175 | ⊚ | " |
| Steel sheet for comparison | | | | |
| 1 | 2,300 | 420 | ○ | 1> |
| 2 | 2,350 | Buckling | ○ | Unmeasurable because of buckling |
| 3 | 2,340 | " | ○ | Unmeasurable because of buckling |
| 4 | 2,300 | " | ○ | Unmeasurable because of buckling |
| 5 | 2,300 | " | ○ | Unmeasurable because of buckling |
| 6 | 2,320 | " | ○ | Unmeasurable because of buckling |
| 7 | 3,500 | 500 | △ | 1> |

As is clear from Table 2, the steel sheets for comparison Nos. 1 to 6 each having a precoating film of one of the precoating compositions Nos. 8 to 13 not containing aluminum powder, on the other surface of the steel sheet, which is to be the inner surface of the can, show a poor strippability in all cases. Particularly, in the steel sheets for comparison Nos. 2 to 6, the side wall of the can body buckled during withdrawal of the punch from the can body. The steel sheet for comparison No. 7, on the both surfaces of which no precoating film is formed, is poor in DI formability and strippability as well as in UCC resistance.

In contrast, all the steel sheets of the invention Nos. 1 to 14 are excellent in DI formability, strippability and corrosion resistance. The precoated steel sheet of the present invention is not limited to uses for manufacturing the DI can, but more widely applicable for the manufacture of the DRD can through the DRD forming and for the manufacture of the drawn can through the drawing forming.

As described above in detail, the precoated steel sheet for a two-piece can of the present invention is excellent in DI formability, DRD formability and corrosion resistance and the precoating film of which is never peeled off or damaged even when ironing the precoated steel sheet at a high forming speed of at least 100 m/minute, thus providing industrially useful effects.

What is claimed is:

1. A precoated steel sheet for a two-piece can, characterized by comprising:
   a steel sheet;
   a precoating film formed on one surface of said steel sheet by applying a precoating composition onto said one surface of said steel sheet and then curing same, said one surface of said steel sheet being to be the outer surface of a two-piece can, and said precoating composition comprising:
   (a) a thermosetting coating material comprising a resin as a solid content and a solvent, and
   (b) an internal lubricant, the content ratio of said internal lubricant being within the range of from 0.1 to 30 weight parts relative to 100 weight parts of said resin as said solid content in said thermosetting coating material; and
   another precoating film formed on the other surface of said steel sheet by applying another precoating composition onto said other surface of said steel sheet and then curing same, said other surface of said steel sheet being to be the inner surface of said two-piece can, and said another precoating composition comprising:
   (a) said thermosetting coating material, and
   (b) an aluminum powder, the content ratio of said aluminum powder being within the range of from 10 to 400 weight parts relative to 100 weight parts of said resin as said solid content in said thermosetting coating material.

2. The precoated steel sheet as claimed in claim 1, wherein:
   particles of said aluminum powder in said another precoating composition applied onto said other surface of said steel sheet have a flake shape.

3. The precoated steel sheet as claimed in claim 2, wherein:
   particles of said aluminum powder have a leafing property.

4. The precoated steel sheet as claimed in claim 1, wherein:
   said aluminum powder in said another precoating composition applied onto said other surface of said steel sheet has an average particle size within the range of from 0.5 to 35 $\mu$m.

5. The precoated steel sheet as claimed in claim 1, wherein:
   said internal lubricant in said precoating composition applied onto said one surface of said steel sheet comprises polytetrafluoroethylene modified hydrocarbon wax.

6. The precoated steel sheet as claimed in claim 1, wherein:
   said resin in said thermosetting coating material comprises any one of a mixture of vinyl chloride resin and at least one of phenol resin and epoxy resin; a mixture of epoxy resin and phenol resin; a mixture of epoxy resin and amino resin; a mixture of polyester resin and amino resin; a mixture of epoxy resin and acrylic resin; and a mixture of epoxy-ester resin and amino resin.

7. The precoated steel sheet as claimed in claim 1, wherein:
   said precoating film of said precoating composition formed on said one surface of said steel sheet has a thickness within the range of from 1 to 20 $\mu$m.

8. The precoated steel sheet as claimed in claim 1, wherein:
   said another precoating film of said other precoating composition formed on said other surface of said steel sheet has a thickness within the range of from 1 to 20 $\mu$m.

9. The precoated steel sheet as claimed in claim 2, wherein:
   said aluminum powder in said another precoating composition applied onto said other surface of said steel sheet has an average particle size within the range of from 0.5 to 35 $\mu$m.

10. The precoated steel sheet as claimed in claim 3, wherein:
    said aluminum powder in said another precoating composition applied onto said other surface of said steel sheet has an average particle size within the range of from 0.5 to 35 $\mu$m.

* * * * *